US011143354B2

(12) United States Patent
Zhao (10) Patent No.: US 11,143,354 B2
(45) Date of Patent: Oct. 12, 2021

(54) FOOT FOR HOUSEHOLD APPLIANCE, AND HOUSEHOLD APPLIANCE (71) Applicants: QINGDAO HAIER WASHING MACHINE CO., LTD., Shandong (CN); QINGDAO HAIER SMART TECHNOLOGY R&D CO., LTD., Shandong (CN)

(72) Inventor: Zhiqiang Zhao, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 104 days.

(21) Appl. No.: 16/496,070

(22) PCT Filed: Mar. 23, 2018

(86) PCT No.: PCT/CN2018/080137
§ 371 (c)(1),
(2) Date: Sep. 20, 2019

(87) PCT Pub. No.: WO2018/171706
PCT Pub. Date: Sep. 27, 2018

(65) Prior Publication Data
US 2021/0116065 A1 Apr. 22, 2021

(30) Foreign Application Priority Data
Mar. 23, 2017 (CN) .......................... 201710178177.4

(51) Int. Cl.
*F16M 7/00* (2006.01)
*D06F 39/12* (2006.01)
(Continued)

(52) U.S. Cl.
CPC ............. *F16M 7/00* (2013.01); *D06F 39/125* (2013.01); *F15B 13/04* (2013.01); *D06F 23/02* (2013.01); *F16M 2200/08* (2013.01)

(58) Field of Classification Search
CPC .... F16M 7/00; F16M 2200/08; D06F 39/125; D06F 23/02; F15B 13/04
(Continued)

(56) References Cited

U.S. PATENT DOCUMENTS 2,597,800 A * 5/1952 Hussman ................ F16F 13/00
248/565
2,635,838 A * 4/1953 Branson ................ F16F 15/023
248/562

(Continued)

FOREIGN PATENT DOCUMENTS

CN 102304838 A 1/2012
CN 105220410 A 1/2016
(Continued)

OTHER PUBLICATIONS

International Search Report (PCT/ISA/210), with translation, and Written Opinion (PCT/ISA/237) dated Jun. 28, 2018, by the Chinese Patent Office as the International Searching Authority for International Application No. PCT/CN2018/080137.
(Continued)

*Primary Examiner* — Muhammad Ijaz
(74) *Attorney, Agent, or Firm* — Buchanan Ingersoll & Rooney PC (57) ABSTRACT

A foot for a household appliance includes a hydraulic plate, a sheath connected with the hydraulic plate, an adjustable foot arranged in the sheath and axially moveable relative to the sheath, and a device for communicating the flow of a hydraulic medium between at least two feet of the household appliance. An accommodating chamber is formed by the
(Continued)

hydraulic plate, the sheath and the adjustable foot; the hydraulic medium is arranged in the accommodating chamber, and the hydraulic medium is compressed or expanded along with the change of pressure to drive the adjustable foot to move axially in the sheath for leveling. A control device for turning on/off the flow of the hydraulic medium is provided on the communicating device, a better leveling support effect is achieved by controlling the on/off of the communicating device.

12 Claims, 5 Drawing Sheets

(51) Int. Cl.
  *F15B 13/04* (2006.01)
  *D06F 23/02* (2006.01)
(58) Field of Classification Search
  USPC .......................................................... 248/638
  See application file for complete search history.

(56) References Cited

U.S. PATENT DOCUMENTS

| | | | | |
|---|---|---|---|---|
| 4,625,424 | A * | 12/1986 | de la Haye | G12B 5/00 248/649 |
| 6,935,603 | B2 * | 8/2005 | Kainuma | F16F 15/0275 248/562 |
| 10,859,198 | B2 * | 12/2020 | Zhao | D06F 39/125 |
| 2006/0180720 | A1 | 8/2006 | Coumoyer et al. | |
| 2010/0126075 | A1 | 5/2010 | Akoshita et al. | |

FOREIGN PATENT DOCUMENTS

| | | | |
|---|---|---|---|
| CN | 105755757 | A | 7/2016 |
| CN | 105757408 | A | 7/2016 |
| DE | 2929222 | A1 | 2/1981 |
| DE | 10156397 | A1 | 5/2003 |
| JP | H10090446 | A | 4/1998 |
| JP | 2007-056920 | A | 3/2007 |
| JP | 2009-001189 | A | 1/2009 |
| JP | 2014-206248 | A | 10/2014 |
| KR | 19980020863 | A | 6/1998 |
| KR | 20040003391 | A | 1/2004 |

OTHER PUBLICATIONS

Extended European Search Report dated Mar. 18, 2020, issued by the European Patent Office in corresponding European Application No. 18770242.8. (8 pages).

Office Action (Notice of Reasons for Refusal) dated Mar. 16, 2021, by the Japanese Patent Office in corresponding Japanese Patent Application No. 2019-552158 and English translation of the Office Action. (12 pages).

* cited by examiner

FOOT FOR HOUSEHOLD APPLIANCE, AND HOUSEHOLD APPLIANCE

TECHNICAL FIELD

The present disclosure relates to the technical field of supporting and leveling of household appliances, and more particularly relates to a foot for household appliance and a household appliance.

BACKGROUND

Household appliances are generally provided with leveling devices at the bottoms of housings. During placement of a household appliance, the leveling device can be adjusted to make the household appliance reach a stably placed state. After the household appliance is leveled and placed, the leveling device can support the household appliance to keep the household appliance stable.

A washing machine is taken as an example. An existing washing machine is generally provided with bolt feet at the bottom of the housing or the whole machine. The bolt foot includes a screw rod, a nut washer and a rubber pad. The nut washer can screw up and down on the screw rod, and the screw rod can also be screwed up and down in a screw hole of a bottom plate of the housing. The height of the washing machine can be adjusted by screwing the screw rod of the bolt foot into different lengths of the screw hole of the bottom plate. Most of washing machines are heightened by anticlockwise rotating the bolt feet, and are lowered by clockwise rotating the feet. After the height of the bolt foot is adjusted, the nut washer for preventing looseness is tightened to keep the stability.

Although the foot of the above washing machine realizes the leveling of the washing machine, a user needs to perform manual adjustment. If the washing machine has a larger self-weight or an mounting space is narrow, user operation is extremely inconvenient. In addition, vibration of the washing machine during long-term work also has an effect on the leveling of the feet, which easily leads to a supporting failure and causes uneven placement of the washing machine.

For example, the existing 8 KG drum washing machine, generally about 80 Kg, is relatively heavy, and it is extremely inconvenient for a consumer to adjust. The washing machine cannot be guaranteed to be adjusted to an optimal state even if the washing machine is adjusted. During washing, especially during spin-drying from 0 r/min to about 1,400 r/min, once the washing machine is not leveled or a problem of supporting failure exists, great vibration will be caused, and greatly affects the use comfort of the consumer.

In addition, the vibration caused by the unevenness of the washing machine may cause the screws of the feet to be loose and cause foot brackets to move vertically. This instability may change the horizontal state of the washing machine, resulting in more intense vibration. By this vicious cycle, if the washing machine is used for a long time, bigger and bigger noise will be generated, and the washing machine itself will be damaged in a certain degree as well, thus the service life of the washing machine is shortened.

Therefore, the leveling of the existing washing machine has the problems that manual adjustment is needed, so that both time and labor are wasted, and the precision is relatively low.

In view of this, the present disclosure has been specifically disclosed.

SUMMARY

In order to solve the above problems, a first disclosure objective of the present disclosure is to provide a foot for household appliance. Specifically, the following technical solution is adopted:

a foot for household appliance comprising:
a hydraulic plate;
a sheath, being fixedly connected with the hydraulic plate;
an adjustable foot, being arranged in the sheath and axially movable relative to the sheath, an accommodating chamber being formed by the hydraulic plate, the sheath and the adjustable foot;
a hydraulic medium, being arranged in the accommodating chamber, and the hydraulic medium being compressed or expanded depending on the pressure changes to drive the adjustable foot to move axially in the sheath for leveling;
a communicating device for communicating at least two feet for the household appliance to realize a flowing of the hydraulic medium between the two feet for the household appliance;
a control device for turning on/off the flowing of the hydraulic medium being provided on the communicating device.

Further, the communicating device comprises a hydraulic pipe and a communicating piece, and at least the two feet for the household appliance is communicated to the communicating piece though the hydraulic pipes respectively. The control device is provided inside the communicating piece.

Further, a liquid flowing passage for circulating the hydraulic medium is provided inside the communicating piece, the control device controls the on/off of the liquid flow passage to control the on/off of the flowing of the hydraulic medium.

Further, the control device is a manual control valve, the manual control valve includes a sealing portion cooperated with the liquid flowing passage and a connecting portion connected with the sealing portion, the sealing portion is driven by a motion of the connecting portion to open or close the liquid flowing passage.

Further, the sealing portion is a valve ball arranged in the liquid flowing passage, the valve ball is in sealed contact with an inner wall of the liquid flowing passage to close the liquid flowing passage, and the valve ball is provided with a through valve hole. The connecting portion is a valve rod; one end of the valve rod sticks inside the communicating piece and is connected with the valve ball, and the other end of the valve rod sticks outside the communicating piece. The valve rod is rotated to drive the valve ball to rotate till the through valve hole is communicated with the liquid flowing passage so as to open the liquid flowing passage.

Further, the valve rod sticks out from a bottom side of the communicating piece, a mounting hole for the valve rod going through is provided on the bottom side of the communicating piece.

Further, the manual control valve comprises a bearing and a knob, the bearing is provided on the communicating piece, and the valve rod is disposed though the bearing to prevent the valve rod form deflecting, the knob is mounted on one end of the valve rod protruding.

Further, at least two liquid flowing passages are provided inside the communicating piece, a number of the control device provided is set according to a number of the liquid flowing passage provided, thus each one of the control devices control the on/off of the flow of one of liquid flowing passages; or one control device simultaneously controls the on/off of all the liquid flowing passages.

The second object of the present disclosure is to disclose a household appliance provided with the above-mentioned foot for household appliance, including a housing. The bottom of the housing is provided with at least two feet for household appliance communicated with each other.

Further, a door corresponding to the control device is arranged on the housing. A user opens the door to directly operate the control device to control the hydraulic medium to flow or be cut off between the feet for household appliance. The communicating device which communicates at least two feet for the household appliance of the present disclosure is provided with the control device. When a user chooses to turn on the control device, the height of the feet for the household appliance is different due to the uneven ground. The hydraulic medium circulates between the feet for household appliance that communicate with each other, and the adjustment foot can be shortened like a piston to achieve the same internal hydraulic pressure, and the automatic leveling is completed.

After the feet for household appliance are leveled, the consumer selects to turn off the control device, and the hydraulic medium no longer flows between the feet for household appliance, thereby realizing steady and rigid supporting for the household appliance and effectively reducing the working vibration of the household appliance.

The household appliance of the present disclosure is automatically leveled by using the above-mentioned feet for household appliance, the mounting is simple and convenient, and the overall vibration and noise of the household appliance are reduced.

Reference numerals in the drawings: 100—foot for household appliance; 101—hydraulic plate; 1011—avoiding port; 1012—first mounting hole; 1013—second mounting hole; 1014—hydraulic nozzle; 1015—anti-separation protrusion; 1016—third mounting hole; 1017—hydraulic plate groove; 102—hydraulic medium; 103—sheath; 1031—guide limiting groove; 1032—mounting plane; 1033—stop end part; 104—adjustable foot; 1041—first guide limiting block; 1042—second guide limiting block; 105—rubber pad; 106—pressure ring; 107—protective ring; 1071—embedding slot; 1072—protective curved surface; 108—flexible accommodating body; 1081—accommodating main body; 200—hydraulic pipe; 400—communicating piece; 405—liquid flowing passage 1002—bolt foot; 1003—front panel; 1004—door window; 1005—operating panel; 1006—detergent drawer; 1007—upper worktop; 1008—side panel; 1200—control device; 1201—knob; 1202—bearing; 1203—valve rod; 1204—valve ball; and 1205—through valve hole.

DETAILED DESCRIPTION

A foot for a household appliance and a household appliance of the present disclosure will be described in detail below in conjunction with the accompanying drawings.

Embodiment I

As shown in FIGS. 2 to 6, a foot for household appliance of the present embodiment comprises:

a hydraulic plate 101;

a sheath 103, fixedly connected with the hydraulic plate 101;

an adjustable foot 104, arranged in the sheath 103 and capable of axially moving relative to the sheath 103, an accommodating chamber is formed by the hydraulic plate 101, the sheath 103 and the adjustable foot 104;

a hydraulic medium 102, arranged in the accommodating chamber, wherein the hydraulic medium 102 is compressed or expanded depending on pressure changes to drive the adjustable foot 104 to move axially in the sheath 103 for leveling;

a communicating device, communicating at least two feet 100 for the household appliance to realize a flowing of the hydraulic medium between the feet for the household appliance;

a control device 1200 for turning on/off the flowing of the hydraulic medium being provided on the communicating device.

Figure 2:
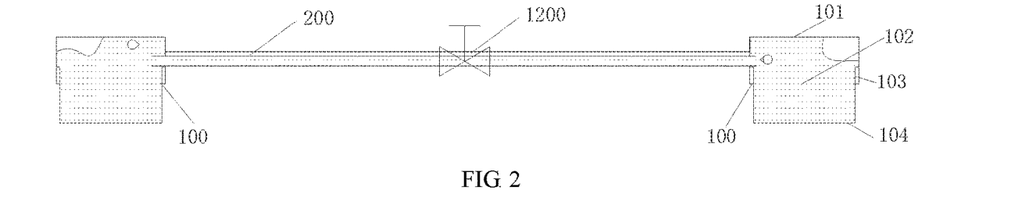
FIG. 2 is an operating-principle schematic diagram of the feet for household appliance according to Embodiment I of the present disclosure.

A control device 1200 is provided on the communicating device of the present embodiment, when a user chooses to turn on the control device 1200, the height of the feet for the household appliance is different due to the uneven ground. The hydraulic medium 102 circulates between the feet 100 for household appliance that communicate with each other, and the adjustment foot 104 can be shortened like a piston to achieve the same internal hydraulic pressure, and the automatic leveling is completed.

After the feet for household appliance are leveled, a user selects to turn off the control device 1200, and the hydraulic medium 102 no longer flows between the feet for household appliance 100, thereby realizing steady and rigid supporting for the household appliance and effectively reducing the working vibration of the household appliance.

Figure 3:
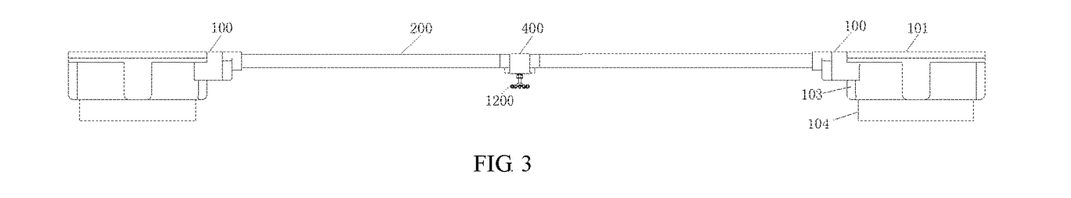
FIG. 3 is a top view of feet for household appliance according to Embodiment I of the present disclosure.
Figure 4:
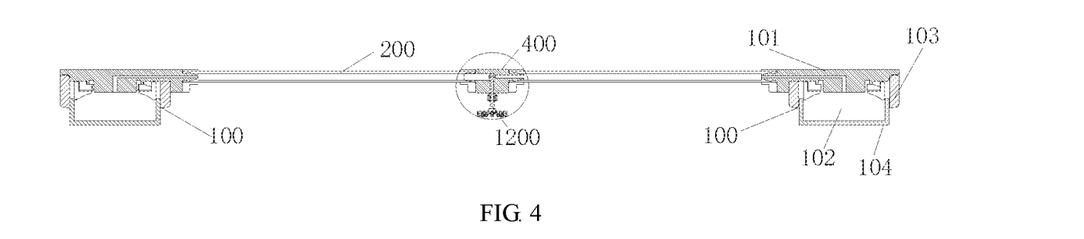
FIG. 4 is a sectional view of the feet for household appliance according to Embodiment I of the present disclosure.

As a specific implementation manner of this embodiment, the communicating device comprises a hydraulic pipe 200 and a communicating piece 400, and at least two feet 100 for the household appliance is communicated to the same communicating piece 400 though the hydraulic pipes 200 respectively. The control device 1200 is provided inside the communicating piece 400.

Figure 5:
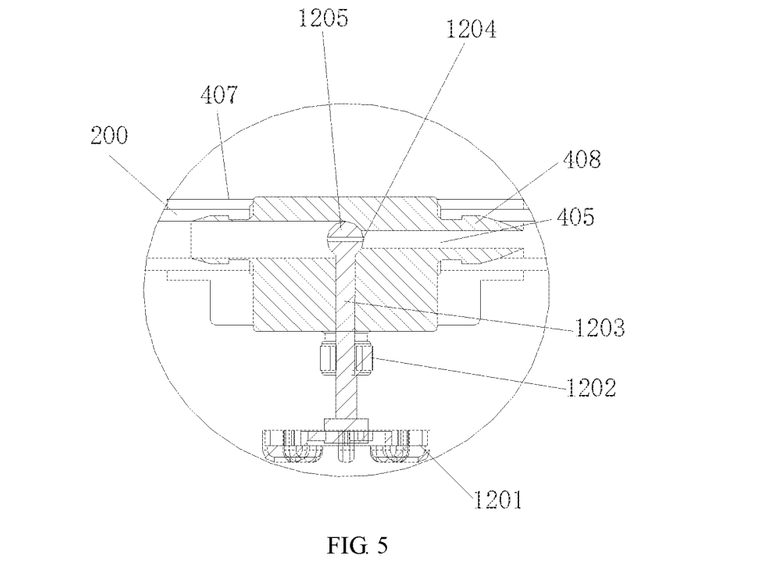
FIG. 5 is a partially enlarged view of the feet for household appliance of FIG. 4 according to Embodiment I of the present disclosure (a control device is in an on state)
Figure 6:
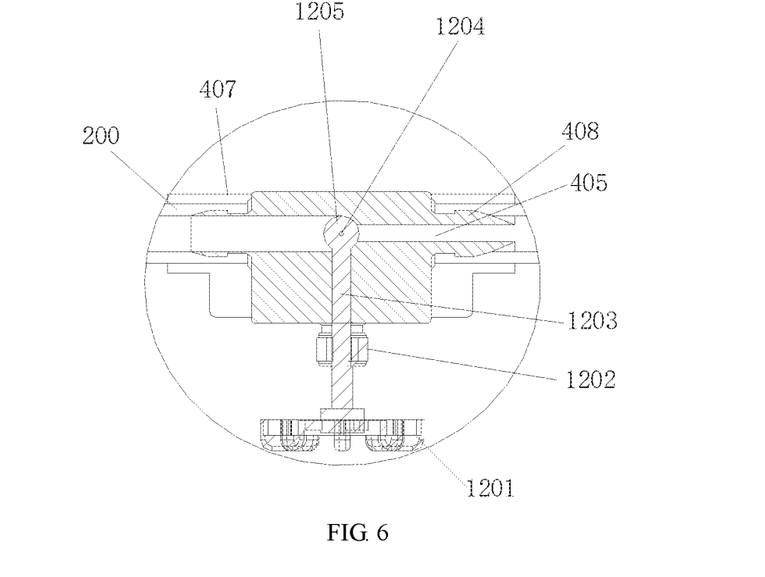
FIG. 6 is a partially enlarged view of the feet for household appliance of FIG. 4 according to Embodiment I of the present disclosure (a control device is in an off state)
Figure 7:
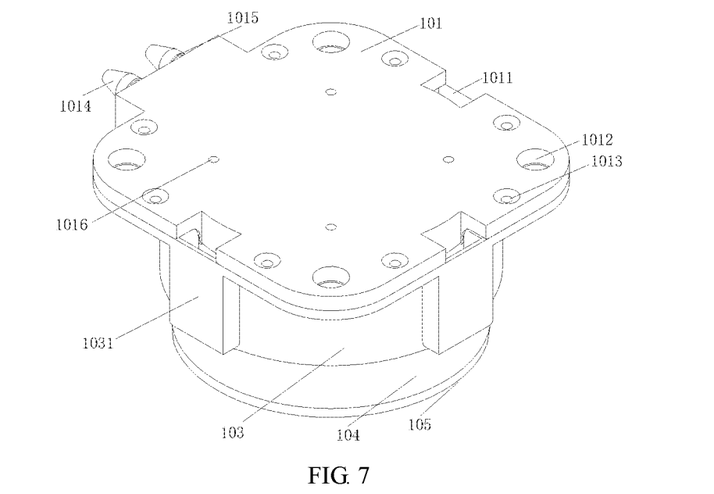
FIG. 7 is a three-dimensional structural schematic diagram of a foot for household appliance according to Embodiment II of the present disclosure.
Figure 8:
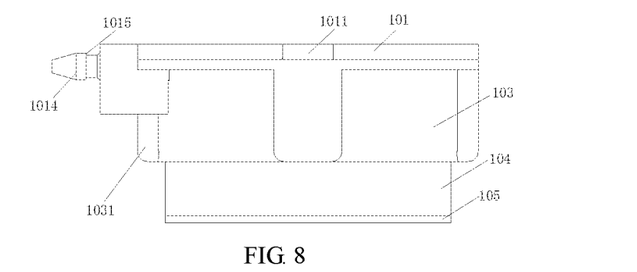
FIG. 8 is a front view of the foot for household appliance according to Embodiment II of the present disclosure.
Figure 9:
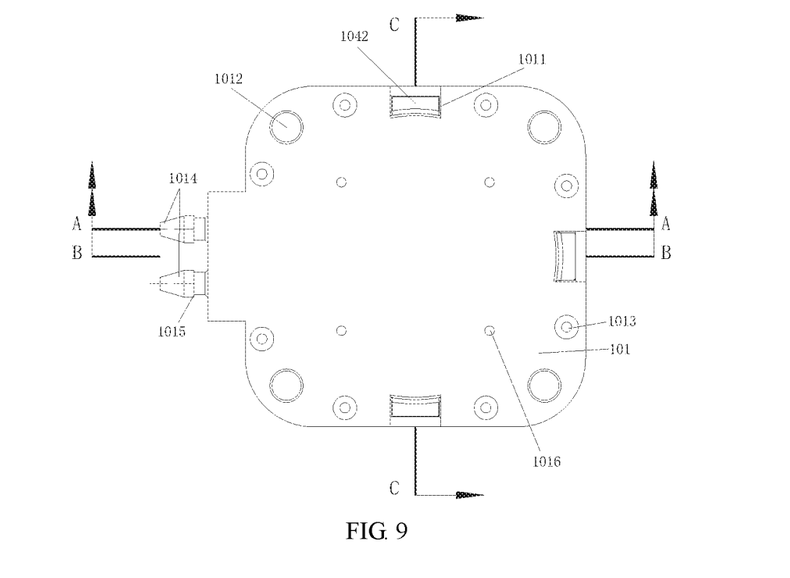
FIG. 9 is a top view of the foot for household appliance according to Embodiment II of the present disclosure.
Figure 10:
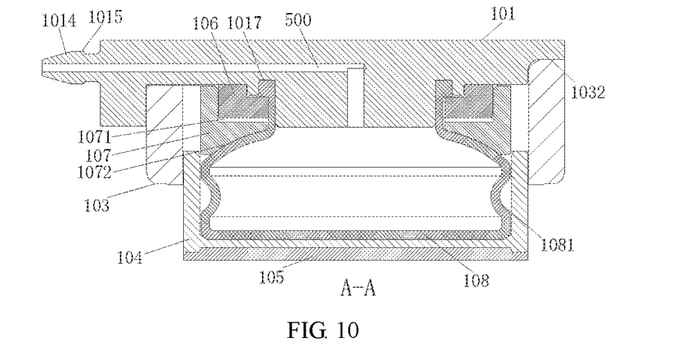
FIG. 10 is a sectional view of the foot for household appliance along the face A-A in FIG. 9 according to Embodiment II of the present disclosure.
Figure 11:
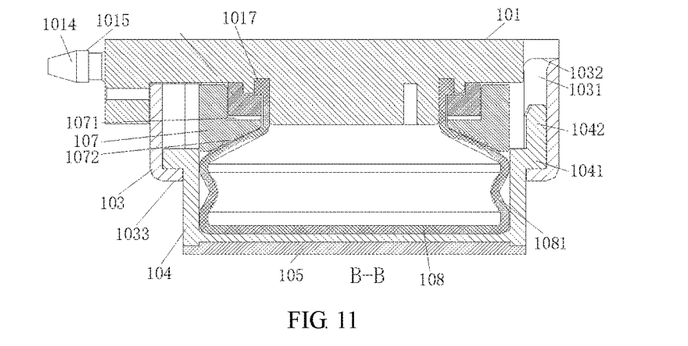
FIG. 11 is a sectional view of the foot for household appliance along the face B-B in FIG. 9 according to Embodiment II of the present disclosure.
Figure 12:
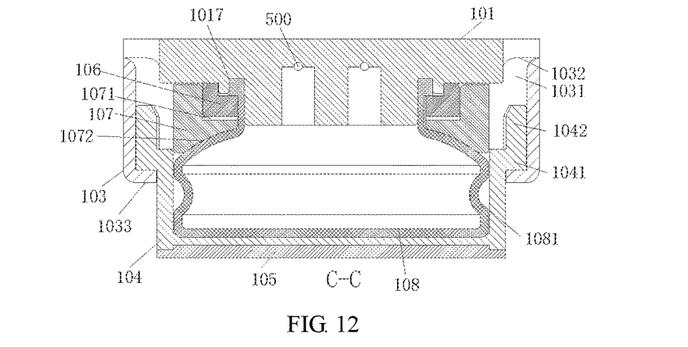
FIG. 12 is a sectional view of the foot for household appliance along the face C-C in FIG. 9 according to Embodiment II of the present disclosure.
Figure 13:
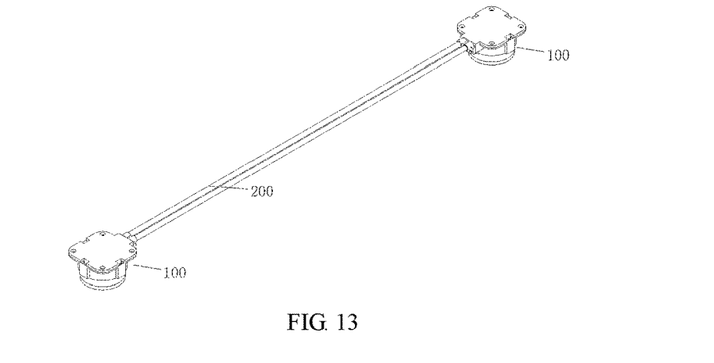
FIG. 13 is a schematic diagram of a combination mode I of the foot for household appliance according to Embodiment II of the present disclosure.
Figure 14:
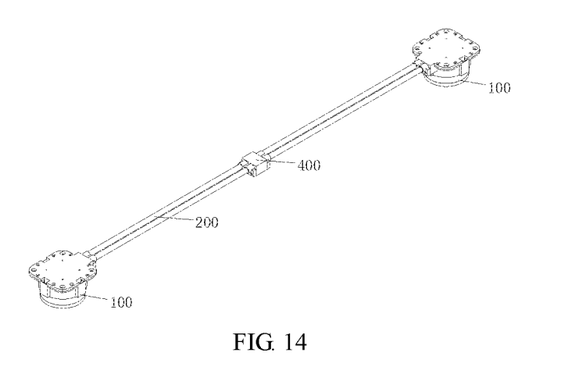
FIG. 14 is a schematic diagram of a combination mode II of the foot for household appliance according to Embodiment II of the present disclosure.

Further, a liquid flowing passage 405 for circulating the hydraulic medium is provided inside the communicating piece 400, the control device 1200 controls the on/off of the liquid flow passage 405 to control the on/off of the flowing of the hydraulic medium 102.

In order to facilitate the user to selectively on/off the control device 1200 according to actual use condition, as a specific implementation manner of this embodiment, the control device 1200 is a manual control valve. The manual control valve includes a sealing portion cooperated with the liquid flowing passage 405 and a connecting portion connected with the sealing portion. The sealing portion is driven by the motion of the connecting portion to open or close the liquid flowing passage.

In order to limit the flow velocity of the hydraulic medium and prevent a relatively large pressure change from causing sudden flowing of the hydraulic medium, the liquid flowing passage 405 in the present embodiment is a throttling flowing passage for limiting the flow velocity of the hydraulic medium 102.

As a preferable implementation of the present embodiment, the sealing portion is a valve ball 1204 arranged in the liquid flowing passage. The valve ball 1204 is in sealed contact with the inner wall of the liquid flowing passage to close the liquid flowing passage, and the valve ball 1204 is provided with a through valve hole 1205, the connecting portion is a valve rod 1203. One end of the valve rod 1203 is inside the communicating piece 400 and is connected with the valve ball 1204, and the other end of the valve rod sticks outside the communicating piece. The valve rod 1203 is rotated to drive the valve ball 1204 to rotate till the through valve hole 1205 is communicated with the liquid flowing passage 405 so as to open the liquid flowing passage. The manual control valve in the present embodiment is simple in structure and convenient to operate, and can realize control of the opening and closing of the liquid flowing passage through rotation.

Further, the valve rod 1203 sticks out from a bottom side of the communicating piece 400, a mounting hole for the valve rod 1203 going through is provided on the bottom side of the communicating piece 400. This arrangement makes the installation of the control device not interfere with the bottom of the household appliance, making it easier to install the settings.

Further preferably, the manual control valve comprises a bearing 1202 and a knob 1201, the bearing 1202 is provided on the communicating piece, and the valve rod 1203 is disposed though the bearing 1202 to prevent the valve rod 1203 form deflecting, thereby better operating the valve rod 1203 to drive the valve ball 1204 to rotate. The knob 1201 is mounted on one end of the valve rod 1203 protruding.

As a preferable implementation of the present embodiment, at least two liquid flowing passages 405 are provided inside the communicating piece 400, the number of the control device provided is set according to the number of the liquid flowing passage, thus each one of the control devices control the on/off of the flow of one of liquid flowing passages; or one control device simultaneously controls the on/off of all the liquid flowing passages.

The present embodiment also provides a household appliance provided with the above-mentioned foot for household appliance, including housing. The bottom of the housing is provided with at least two feet for household appliance communicated with each other.

Further, a door corresponding to the control device is arranged on the housing. A user opens the door to directly operate the control device to control the hydraulic medium to flow or be cut off between the feet for household appliance.

Figure 1:
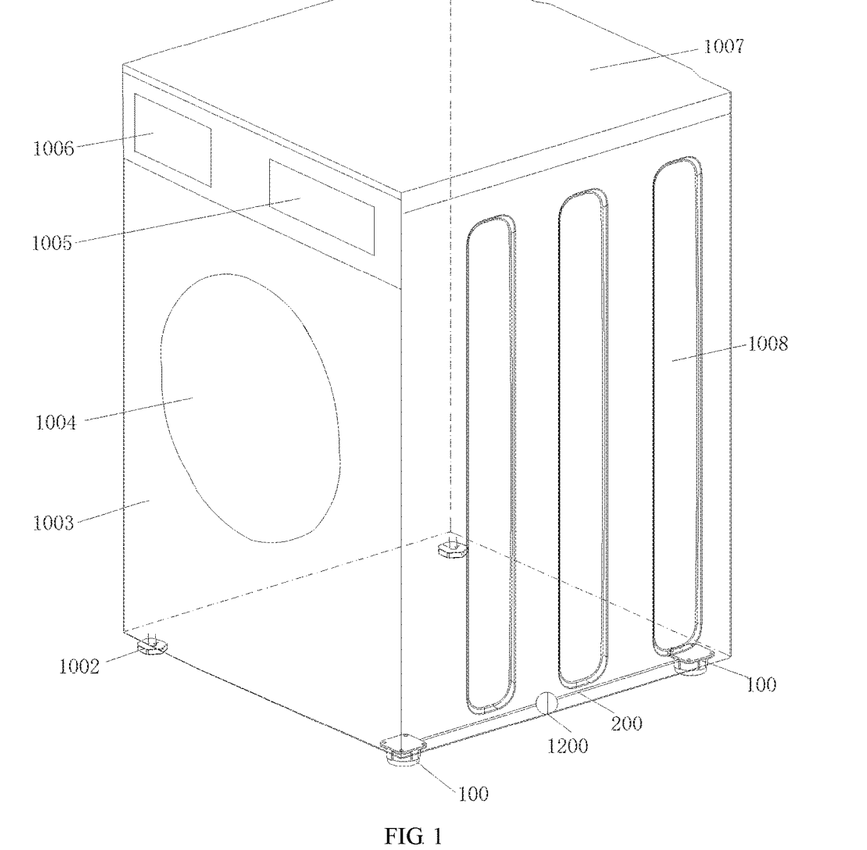
FIG. 1 is a three-dimensional structural schematic diagram of feet for household appliance, which are assembled on a washing machine, according to Embodiment I of the present disclosure.

The household appliance of the present embodiment is a washing machine, the washing machine of the present embodiment can be a pulsator washing machine, a drum washing machine, or an agitator washing machine. The drum washing machine is taken as an example in the present embodiment, as shown in FIG. 1.

The washing machine of the present embodiment is provided with a casing including the front panel 1003, a rear panel, side panels 1008, an upper worktop 1007 and a bottom plate. The front panel 1003 is provided with a door window 1004, so that the consumer can conveniently open the door window for taking out clothes from and putting clothes into the washing machine. an inner drum and an outer drum for washing are coaxially arranged inside the casing. The outer drum is used for containing washing water and rinsing water, and the inner drum can rotate to wash the clothes by beating. The upper part of the front panel 1003 of the washing machine is provided with a detergent drawer 1006 into which the consumer can put a clothes treating agent, and an operating panel 1005 that is convenient for the consumer to select an appropriate washing procedure.

A main technical solution of the present embodiment is that the manual control valve is arranged on the foot for household appliance 100, and the consumer can manually control the liquid flowing passage on the feet for household appliance 100 to open and close.

After the washing machine is placed on the ground, the user rotates the knob to open the manual control valve to open the communicating device between the feet for household appliance 100, so that the hydraulic medium may automatically flow between the feet for household appliance 100 according to different pressure to realize uniform pressure. After the washing machine is automatically adjusted to be stabilized within a certain period of time such as 30$s$, the user then closes the manual control valve through the knob on the washing machine to turn off the communicating device between the feet 100 for the household appliance, so that the hydraulic medium no longer flows between the feet for household appliance 100. When the washing machine is not moved, the hydraulic medium does not need to flow between the feet for household appliance 100, and the feet for household appliance 100 become rigid feet for steadily supporting the washing machine.

Of course, when the washing machine is moved again, the user needs to open the manual control valve with the knob, so that the hydraulic medium between the feet for household appliance 100 flows to automatically readjust the washing machine to a steady state, and then the user closes the manual control valve again.

The technical solution realizes that the user rotates the knob to realize automatic leveling of the washing machine, thereby avoiding the problem that the consumer is time-consuming and laborious to rotate through the screw nut and the leveling effect is poor.

Embodiment II

As shown in FIGS. 7 to 14, a foot for household appliance of the present embodiment includes:

a hydraulic plate 101;

a sheath 103, fixedly connected with the hydraulic plate 101;

an adjustable foot 104, arranged in the sheath 103 and capable of axially moving relative to the sheath 103, an accommodating chamber is formed by the hydraulic plate 101, the sheath 103 and the adjustable foot 104;

a hydraulic medium 102, arranged in the accommodating chamber, wherein the hydraulic medium is compressed or expanded depending on pressure changes to drive the adjustable foot 104 to move axially in the sheath 103 for leveling.

According to the foot for household appliance of the present embodiment, the adjustable foot can perform automatic and adaptive adjustment according to a hydraulic principle due to the flowability of the hydraulic medium under different pressure caused by unevenness, till the foot for household appliance is balanced, and then the hydraulic medium stops flowing to realize automatic leveling.

According to the foot for household appliance of the present embodiment, a first mounting structure fixedly connected with a bottom plate of the household appliance is arranged on the hydraulic plate 101. And a second mounting structure fixedly connected with the sheath is arranged on the hydraulic plate 101.

In the present embodiment, the adjustable foot 104 is axially movably sleeved in the sheath 103, and the hydraulic plate 101 is fixedly connected with the sheath 103 by the second mounting structure, so as to realize independent assembling of the foot for household appliance. The assembled foot for household appliance is overall mounted on the bottom plate of the household appliance through the first mounting structure, so that the foot for the household appliance is mounted on the household appliance.

The present embodiment realizes the assembling of the foot for household appliance through the second mounting structure, and realizes the mounting of the foot for household appliance on the household appliance through the first mounting structure. And corresponding mounting is achieved through different mounting structures, so that the global stability of the foot for household appliance is ensured, and the stability of mounting of the foot for household appliance on the household appliance is also ensured.

In the present embodiment, the hydraulic plate 101 of the foot for household appliance is directly fixed at the bottom of the household appliance, and the sheath 103 is fixedly connected with the hydraulic plate 101. In this way, the hydraulic plate 101 is clamped by the bottom of the household appliance and the sheath 103, so that the strength of fixed connection between the hydraulic plate 101 and the sheath 103 is unnecessary. The connection between the hydraulic plate 101 and the sheath 103 is mainly to form an integrated foot, and the strength at a joint is unrelated to the weight of the household appliance and a supporting force of the adjustable foot 104. Therefore, the foot for household appliance of the present disclosure can realize fast and reliable fixed connection between the hydraulic plate 101 and the sheath 103, lower a requirement on the connection strength of the hydraulic plate 101 and the sheath 103, and further reduce a necessary space and height for connection.

In conclusion, the foot for household appliance of the present embodiment is simpler in structure, simpler and more convenient to mount and higher in stability.

In addition, the structural design of the foot for household appliance of the present embodiment can also reduce the overall height, and has a better vibration absorption effect on the household appliance, such as a washing machine. The foot for household appliance of the present disclosure has better vibration absorption effect on vibration generated during dewatering of the washing machine.

As a preferable implementation of the present embodiment, the first mounting structures are first mounting holes 1013 formed in the hydraulic plate, and the hydraulic plate 101 is fixedly connected to the bottom plate of the household appliance in a manner that first connection pieces pass through the first mounting holes 1013.

Specifically, the first mounting holes 1013 in the present embodiment are screw holes, and the first connection pieces are screws. Mounting holes for allowing the screws to pass through are formed in the bottom plate of the household appliance. The screws pass through the mounting holes in the bottom plate and are mounted on the screw holes in the hydraulic plate 101 to achieve fixed mounting.

Specifically, the second mounting structures in the present embodiment are second mounting holes 1012. The hydraulic plate is fixedly connected with the sheath in a manner that second connection pieces pass through the second mounting holes.

Further, the upper end of the sheath 103 in the present embodiment is outwards flanged to form a mounting plane 1032. The mounting plane 1032 is attached to and fixedly connected with the bottom surface of the hydraulic plate 101. Fourth mounting holes corresponding to the second mounting holes 1012 are formed in the mounting plane 1032.

In the present embodiment, the mounting plane 1032 of the sheath 103 is attached to the hydraulic plate 101, so that more pressure can be transmitted onto the mounting plane 1032 to be dispersed to prevent the hydraulic plate 101 from being subjected to extremely high pressure. Since the hydraulic plate 101 is internally provided with a liquid flowing passage for allowing the hydraulic medium to flow, the stability of the hydraulic plate 101 is the key to stabilizing and leveling of the whole foot for the household appliance. The mounting plane 1032 in the present embodiment is formed by outwards flanging the upper end of the sheath 103, so that a mounting contact area of the sheath 103 and the hydraulic plate 101 is enlarged, which is more favorable for the stability and dispersity of force transmission from the hydraulic plate 101 to the mounting plane 1032 of the sheath 103.

In addition, the mounting plane 1032 of the sheath 103 is attached to and fixedly connected with the hydraulic plate 101, so that the design of a mounting structure on the sheath 103 or the hydraulic plate 101 is avoided, and the overall structure of the foot for household appliance is reduced.

Further, the outer contour of the mounting plane 1032 in the present embodiment is matched with the outer contour of the hydraulic plate 101, and the mounting plane 1032 is attached to and fixedly connected with the bottom surface of the hydraulic plate 101. In this way, the pressure applied to the hydraulic plate 101 can be better correspondingly transmitted to the mounting plane 1032 of the sheath 103, so that the condition that stress concentration occurs due to the fact that part of the hydraulic plate 101 is not supported by the mounting plane 1032 is avoided, and stable flowing of the hydraulic medium in the hydraulic plate is better facilitated.

Preferably, the outer contour of the hydraulic plate 101 in the present embodiment is similar to or the same as the outer contour of the mounting plane 1032. In this way, the hydraulic plate and the mounting plane can be mounted by corresponding to each other, so that the mounting is simpler and more convenient.

Specifically, the sheath 103 in the present embodiment includes a sleeve portion with a hollow interior. One end of the adjustable foot 104 is sleeved with the sleeve portion and may axially move relative to the sleeve portion. The upper end of the sleeve portion is outwards flanged to form the mounting plane 1032. The mounting plate 1032 is attached to and fixedly connected with the bottom surface of the hydraulic plate 101. The mounting plane 1032 in the present embodiment is formed by outwards flanging of the upper end of the sleeve portion. For the axial movement of the adjustable foot 104 in the sheath 103, only the area of the mounting plane is enlarged instead of overall enlarging the sheath 103, so that materials are saved, and the cost is reduced.

Specifically, the hydraulic plate 101 in the present embodiment is of a square flat plate structure. The sleeve portion is of a cylindrical structure. The upper end of the cylindrical structure is outwards flanged to form a square mounting plane 1032 matched with the hydraulic plate. The square flat plate structure is attached to and fixedly connected with the square mounting plane.

Specifically, the four corners of the hydraulic plate in the present embodiment are each provided with at least one second mounting structure, and at least one side of each mounting structure is provided with a first mounting structure.

Preferably, the four corners of the hydraulic plate 101 are each provided with a second mounting hole 1012, and two sides of each second mounting hole 1012 are each provided with a first mounting hole 1013.

In the present embodiment, according to the structure and mounting characteristics of the foot for household appliance, the first mounting holes 1013 are more than the second mounting holes 1012 to ensure the steadiness of mounting of the foot on the household appliance. The first mounting holes 1013 are distributed on two sides of the second mounting holes 1012. In this way, the whole weight of the household appliance can be distributed on the hydraulic plate 101 more uniformly to avoid damage caused by the partial stress concentration of the hydraulic plate.

As a mounting mode of the present embodiment, the sheath 103 in the present embodiment and the hydraulic plate 101 may also be fixedly connected in a clamping, or sticking, or hot melting, or welding manner, and then the whole body of the sheath and the hydraulic plate is fixedly mounted at the bottom of the household appliance.

The hydraulic plate 101 in the present embodiment is made by performing injection molding on plastic or metal die casting, and the sheath 103 is made by performing injection molding on plastic or metal die casting.

According to a force bearing characteristic of the foot for household appliance of the present embodiment, preferably, the hydraulic plate 101 is made by performing injection molding on plastic, and the sheath 103 is made by metal die casting. Since the sheath 103 bears a relatively large force, the metal die casting is adopted to guarantee the strength. In this way, the foot for household appliance of the present embodiment is lower in manufacturing cost, and the overall strength of the foot can be guaranteed.

A partial weight F1 of the household appliance is applied to the hydraulic plate 101 through the bottom plate. The plane of the hydraulic plate 101 may transmit the force to the mounting plane 1032 of the sheath 103. The interior of the hydraulic plate 101 transmits hydraulic pressure to the adjustable foot 104, and a supporting force F2 of a supporting plane is also applied to the adjustable foot 104, and F1 is equal to F2. The force applied to the adjustable foot 104 is transmitted to the plane of the hydraulic plate 101, and the hydraulic plate 101 then transmits the force to the bottom plate of the household appliance. By this design, the hydraulic plate 101 bears the pressure of the internal liquid flowing passage, partial weight of the washing machine and the supporting force of the adjustable foot 104, but these forces are all transmitted to the mounting plane 1032 of the sheath 103, the adjustable foot 104 and the bottom plate of the household appliance.

As a preferable implementation of the present embodiment, the foot for household appliance of the present embodiment also includes a flexible accommodating body 108 which is internally provided with an accommodating chamber. The hydraulic medium is accommodated in the flexible accommodating body 108. A third mounting structure for hermetically mounting the flexible accommodating body 108 is arranged on the hydraulic plate 101.

Specifically, the liquid flowing passage is formed inside the hydraulic plate 101. The flexible accommodating body 108 is provided with an open portion. The open portion of the flexible accommodating body 108 is fixedly mounted on the bottom surface of the hydraulic plate 101 through a pressure ring 106 and communicates with the liquid flowing passage. The third mounting structures are third mounting holes 1016. The pressure ring 106 is assembled on the third mounting holes 1016 through third connection pieces.

Further, the third mounting holes 1016 in the present embodiment are formed in the middle of the hydraulic plate. There are at least four third mounting holes 1016 which are correspondingly formed in the four corners of the hydraulic plate 101 respectively.

As a preferable implementation of the present embodiment, the open portion of the flexible accommodating body 108 in the present embodiment is fixedly mounted on the bottom surface of the hydraulic plate 101 through the pressure ring 106, and the pressure ring 106 and the hydraulic plate 101 jointly extrude the open portion to make it deform for sealing. The pressure ring 106 extrudes the open portion to make it deform for sealing, so that the operation is simpler and more convenient, and the sealing effect is good.

Further, the flexible accommodating body 108 includes a small-diameter portion. An end portion of the small-diameter portion is outwards flanged to form the open portion. The pressure ring 106 sleeves on the small-diameter portion. The pressure ring 106 and the hydraulic plate 101 jointly extrude the open portion to make it deform for sealing. In the present embodiment, during hermetical mounting of the flexible accommodating body 108, the small-diameter portion may clamp and sleeve the pressure ring 106 first, and only the pressure ring 106 needs to be fixedly mounted. In a fastening process, the pressure ring 106 extrudes the open portion to realize the hermetical mounting.

As a preferable implementation of the present embodiment, the bottom surface of the hydraulic plate 101 is provided with a hydraulic plate groove. The open portion of the flexible accommodating body 108 is extruded to deform by the pressure ring 106 to fill the hydraulic plate groove for sealing. In this way, the pressure ring 106 is then fastened to extrude the open portion of the flexible accommodating body 108 to make the open portion deform to fill the hydraulic plate groove to realize sealing, so that the structure is simple, and the sealing is reliable and effective.

Preferably, the volume defined by the hydraulic plate groove and the pressure ring 106 is less than the volume of the open portion of the flexible accommodating body 108. In this way, the open portion of the flexible accommodating body 108 is in tight contact with the hydraulic plate groove to ensure the sealing property.

The pressure ring 106 in the present embodiment is fixed on the hydraulic plate 101 by a fixing device. Specifically, the pressure ring 106 and the hydraulic plate 101 can be fixedly connected by bolts or screws. Pressure ring mounting holes are formed in the pressure ring 106. The bolts or screws pass through the pressure ring mounting holes and are fastened on the third mounting holes 1016 of the hydraulic plate 101.

The flexible accommodating body 108 in the present embodiment includes an accommodating main body 1081 that is of a soft bag structure and has a telescopic corrugated structure. The corrugated structure is arranged in the adjustable foot 104, and telescopically drives the adjustable foot 104 to move axially in the sheath 103 for leveling as the hydraulic medium flows.

The foot for household appliance of the present embodiment also includes a protective piece 107 for protecting the flexible accommodating body 108. The pressure ring 106 is embedded into the protective ring 107 to achieve the following technical effects.

1. The pressure ring 106 and the protective ring 107 in the present embodiment are installed in an embedded manner, which can play a limit function and avoid arrangement of a complicated limiting structure and achieve simplicity and stability.

2. When the foot for household appliance of the present embodiment is under a great impact pressure of (when the household appliance or object mounted with the foot for household appliance is suddenly placed during falling or raising), there is no clearance between the protective ring 107 and a pressure application attachment surface of the flexible accommodating body 108, so that the problems that the flexible accommodating body 108 expands and breaks apart, and the like are avoided, and the reliability is improved.

3. Since the pressure ring 106 and the protective ring 107 are installed in an embedded manner in the present embodiment, the mounting heights of the pressure ring 106 and the protective ring 107 are reduced, so that the overall height of the foot for household appliance is reduced. Therefore, when the foot is mounted on the household appliance, the foot has little impact on the overall gravity center of the household appliance, and is more favorable for the supporting stability of the household appliance. A better vibration absorption effect is achieved on the vibration (such as the vibration generated during dewatering of the washing machine) generated in a working process of the household appliance.

As a preferable implementation of the present embodiment, one end of the protective ring 107 is provided with a protective curved surface 1072, and the protective curved surface 1072 is cooperated with the outer surface of the flexible accommodating body 108 to prevent the flexible accommodating body 108 from being damaged by pressure.

The other end of the protective ring 107 in the present embodiment is provided with an embedding slot 1071, and the pressure ring 106 is embedded into the embedding slot 1071 of the protective ring 107.

As a preferable implementation of the present embodiment, a limiting protrusion is arranged on the inner wall of the embedding slot 1071 of the protective ring 107, and a limiting recess cooperated with the limiting protrusion is arranged on a fixing piece. A limiting structure in the present embodiment is designed according to the embedded mounting of the pressure ring 106 and the protective ring 107, and also realizes a limiting motion during the embedded mounting. The structure is simple, and stability and reliability are realized.

The depth of the embedding slot 1071 in the present embodiment is greater than the thickness of the pressure ring 106, so that the pressure ring 106 may be completely embedded into the embedding slot 1071, so that the mounting height is reduced to a maximum extent to reduce the overall height of the foot for household appliance. Meanwhile, when the foot for household appliance is in an uneven state, the flexible accommodating body 108 undergoes different pressures, so the hydraulic medium flows. The flexible accommodating body 108 telescopically drives the adjustable foot 104 to axially move in the sheath 103 for leveling. The flexible accommodating body 108 inevitably acts on the protective ring 107 during extending and retracting, so the protective ring 107 moves axially under the embedded limitation of the embedding sot 1071 and the pressure ring 106.

According to the structural design in the present embodiment, the outer circumference of the protective ring 107 completely wraps the pressure ring 106, and only the protective ring 107 is pressed into the adjustable foot 104, so that the reliability and the stability of attachment are greatly improved. Therefore, after the protective ring 107 in the present embodiment is pressed into the adjustable foot 104, the protective ring 107 may stably, smoothly and reliably move axially in the adjustable foot 104, so as to ensure that the whole foot for household appliance is more stable and the protective ring 107 and the pressure ring 106 may also move up and down to a certain extent.

The sheath 103 and/or the adjustable foot 104 of the foot for household appliance of the present embodiment are/is provided with a guide limiting mechanism for limiting the adjustable foot 104 to circumferentially rotating relative to the sheath 103. An avoiding port 1011 corresponding to the guide limiting mechanism is formed in the hydraulic plate 101.

The foot for household appliance of the present embodiment automatically levels the household appliance simply and reliably by utilizing a hydraulic principle. Since the adjustable foot 104 may be arranged in the sheath 103 in a manner of being capable of axially moving relative to the sheath 103, the household appliance is only adjusted in the up-down direction. Therefore, in order to guarantee the stability of leveling, the rotation of the adjustable foot 104 relative to the sheath 103 needs to be limited. Therefore, the guide limiting mechanism in the present embodiment is used for limiting the adjustable foot 104 to moving relative to the sheath 103 in a required direction.

In general, vibration may be generated during working of the household appliance (such as the washing machine), in order to guarantee the operation stability of the household appliance, the overall height of the foot for household appliance of the present embodiment shall be reduced as much as possible to reduce the gravity center of the household appliance. Therefore, the avoiding port 1011 corresponding to the guide limiting mechanism is formed in the hydraulic plate 101 in the present embodiment, so that while the arrangement of the guide limiting mechanism is satisfied, the axial movement of the adjustable foot 104 is not affected, so that the overall height of the foot for household appliance can be reduced, and the vibration absorption stability of the foot is improved. Specifically, the guide limiting mechanism includes a guide limiting groove or guide limiting protrusion arranged on the inner wall of the sheath, and a guide limiting protrusion or guide limiting groove correspondingly arranged on the outer wall of the adjustable foot. The guide limiting protrusion may be arranged in the guide limiting groove in a manner of being capable of sliding relative to the guide limiting groove so as to limit the adjustable foot to circumferentially rotating relative to the sheath. The present embodiment may limit the axial movement of the adjustable foot 104 through the matching between the guide limiting groove and the guide limiting protrusion, and the structure is simple and reliable.

The avoiding port 1011 in the present embodiment corresponds to the guide limiting protrusion or guide limiting groove on the adjustable foot 104, and the adjustable foot 104 moves towards the hydraulic plate 101, and one end of the guide limiting protrusion or guide limiting groove on the adjustable foot 104 enters the avoiding port 1011. In the present embodiment, for the axial movement of the adjustable foot 104, the guide limiting mechanism may be any mechanism, as long as an avoiding portion corresponds to the guide limiting protrusion or guide limiting groove on the adjustable foot 104. Therefore, the overall height of the bottom for a household appliance is reduced and the stability of guide limiting is guaranteed on the premise of not changing the adjustment height.

As a preferable implementation of the present embodiment, the inner wall of the sheath 103 is provided with a guide limiting groove 1031 in its axial direction. The outer wall of the adjustable foot 104 is provided with a guide limiting protrusion. The guide limiting protrusion may be arranged in the guide limiting groove 1031 in a manner of being capable of sliding relative to the guide limiting groove 1031 so as to limit the adjustable foot 104 to circumferentially rotating relative to the sheath 103.

In the present embodiment, the avoiding port 1011 is arranged on the hydraulic plate 101 and corresponds to the guide limiting protrusion. When the adjustable foot 104 axially moves up and down in the sheath 103, one end of the guide limiting protrusion enters or leaves the avoiding port 1011.

Therefore, since one end of the guide limiting protrusion enters or leaves the avoiding port 1011, the foot for household appliance of the present embodiment has a greater adjustment height under the same overall height. In the same adjustment height, the foot for household appliance of the present embodiment may have a lesser overall height.

As a preferable implementation of the present embodiment, the guide limiting protrusion includes a first guide limiting block 1041 and a second guide limiting block 1042. The first guide limiting block 1041 is fixed on the outer wall of the adjustable foot 104, and the second guide limiting block 1042 is fixed on the first guide limiting block 1041 and extends towards the hydraulic plate 101 by a certain height. The first guide limiting block 1041 in the present embodiment mainly plays a guide limiting role in the guide limiting groove 1031, and the second guide limiting block 1042 equivalently extends the first guide limiting block 1041 to achieve higher stability of guide limiting.

As a preferable implementation of the present embodiment, there are a plurality of guide limiting mechanisms distributed along the circumferential direction of the sheath 103 and/or the adjustable foot 104, respectively. A plurality of avoiding ports 1011 corresponding to the guide limiting mechanisms are formed in the hydraulic plate 101. In this way, the arrangement of the plurality of guide limiting mechanisms further improves the stability of limiting and has a better guide limiting effect.

In the present embodiment, in order to realize the up-and-down movement of the adjustable foot 104 in the sheath 103 and prevent the circumferential rotation, a certain number N of guide limiting grooves 1031 are formed on the circumference of the sheath 103, and N is greater than or equal to 1. Preferably, four guide limiting grooves are provided in the figure of the present disclosure.

N corresponding guide limiting protrusions are also arranged on the circumference of the adjustable foot 104, and N is greater than or equal to 1. Preferably, four guide limiting protrusions are provided in the figure of the present disclosure. The guide limiting protrusions may move in the guide limiting grooves, and are limited by stop end parts 1032 at the bottoms of the guide limiting grooves 1031 to prevent the adjustable foot 104 from falling off from the sheath 103.

In order to reduce the height of the foot for household appliance as much as possible and achieve higher stability, the heights of the sheath 200 and the adjustable foot 300 may be reduced in principle as much as possible without reducing the height H0, particularly their overlapping portion of the sheath and the adjustable foot is reduced, namely H1 in the figure. When H1 is extremely small, the limiting role of the sheath 200 to the adjustable foot 300 may be reduced, which leads to the problems such as lateral deviation of the adjustable foot 300.

Embodiment III

A foot for household appliance of the present embodiment includes: a hydraulic plate 101, in which a throttling flowing passage is arranged; a sheath 103, fixedly connected with the hydraulic plate 101; an adjustable foot 104, arranged in the sheath 103 and capable of axially moving relative to the sheath 103. An accommodating chamber is defined by the hydraulic plate 101, the sheath 103 and the adjustable foot 104; and a flexible accommodating body 108, which accommodates a hydraulic medium inside and is arranged in the accommodating chamber. Under the action of pressure, the flexible accommodating body 108 telescopically drives the adjustable foot 104 to axially move in the sheath 103 for leveling. The foot also includes a rubber pad 105, fixed at the bottom of the adjustable foot 104. The bottom of the rubber pad 105 has designed lines, so that the friction force to the ground is increased, and the stability is improved.

Embodiment IV

The present embodiment also provides a household appliance provided with the foot for household appliance in any one of the above-mentioned embodiments. The household appliance includes a housing. A plurality of feet for household appliance are mounted at the bottom of the housing. A hydraulic medium filling the feet for household appliance 100 may flow between the feet for household appliance for leveling.

Preferably, at least two feet for household appliance 100 communicate with each other through a communicating device to allow the hydraulic medium to flow between the feet for the household appliance.

The embodiment of the present disclosure takes a washing machine as an example to describe the principle and method for automatically leveling the washing machine by the feet for household appliance. After the washing machine is mounted, since the ground is uneven, different feet for household appliance have different levels, and the foot for household appliance located at a pit on the ground is at a low position. Therefore, it can be known that the foot for household appliance at a high position firstly bears the weight of the washing machine and bears a larger weight. The foot for household appliance at a low position bears a smaller weight due to supporting failure.

The adjustable foot of the foot for household appliance at the higher position will move up under large pressure, and the height of the entire foot is reduced, so that the volume of a hollow chamber of the flexible accommodating body filled with the hydraulic medium is compressed and reduced, thus forcing the hydraulic medium to enter an orifice or a valve hole and enter the foot for a household appliance at the low position through a high-pressure pipe, so that more and more hydraulic medium enters the flexible accommodating body of the foot for a household appliance at the low position, and the flexible accommodating body is expanded to push the adjustable foot to extend.

When the hydraulic pressure in the foot at the high position and the hydraulic pressure in the foot at the low position are the same, the hydraulic medium no longer flows by the high-pressure pipe, and a relative position between the adjustable foot and a bottom plate of the washing machine no longer changes, thereby completing automatic adjustment of the washing machine.

During washing or spin-drying of the washing machine, since the hydraulic medium may also flow slowly to self-level, the vibration noise of the washing machine is greatly reduced.

The hydraulic medium in the present embodiment may be hydraulic oil which has good fluidity and stable composition.

In addition, the foot for household appliance according to each of the above embodiments of the present disclosure may also be applied to household appliances such as a refrigerator, a freezer and an air conditioner indoor unit in addition to the washing machine.

It should be noted that the above various embodiments of the present disclosure may be implemented separately or in a combined manner.

The above descriptions are only preferred embodiments of the present disclosure, but not intended to limit the present disclosure in any forms. Although the present disclosure is disclosed above by the preferred embodiments, the preferred embodiments are not intended to limit the present disclosure. Any person skilled in the art can make some changes by using the above-mentioned technical contents or modify the technical contents as equivalent embodiments of equivalent changes without departing from the scope of the technical solution of the present disclosure. Any simple alterations, equivalent changes and modifications that are made to the above embodiments according to the technical essence of the present disclosure without departing from the contents of the technical solution of the present disclosure shall all fall within the scope of the solution of the present disclosure.

The invention claimed is:

1. A base for a household appliance, comprising:
at least two supports, each of the least two supports including;
a hydraulic plate;
a sheath, being fixedly connected with the hydraulic plate;
an adjustable foot, being arranged in the sheath and axially movable relative to the sheath, an accommodating chamber being formed by the hydraulic plate, the sheath and the adjustable foot;
a hydraulic medium, being arranged in the accommodating chamber, and the hydraulic medium being compressable or expandable depending on pressure changes for driving the adjustable foot to move axially in the sheath for leveling;
a communicating device for communicating the at least two supports for the household appliance to allow the hydraulic medium to flow between the at least two supports for the household appliance; and
a control device, for turning a flow of the hydraulic medium on or off, provided on the communicating device,
the communicating device including hydraulic pipes and a communicating piece, and the at least two supports for the household appliance configured to communicate with the communicating piece though the hydraulic pipes respectively, wherein the control device is provided in the communicating piece.

2. The base for the household appliance according to claim 1, comprising:
at least one liquid flowing passage for circulating the hydraulic medium is provided inside the communicating piece, the control device configured to control the at least one liquid flow passage to be open or closed to turn on or off the flowing of the hydraulic medium.

3. The base for the household appliance according to claim 2, wherein;
the at least one liquid flowing passage includes at least two liquid flow passages provided inside the communicating piece, a number of control devices provided is set according to a number of the at least two liquid flowing passages provided, each one of the control devices controls to turn on or off one of the at least two liquid flowing passages; or one of the control devices simultaneously controls to turn on or off all the at least two liquid flowing passages.

4. The base for the household appliance according to claim 2, wherein:
the control device is a manual control valve, the manual control valve includes a sealing portion cooperating with the at least one liquid flowing passage and a connecting portion connected with the sealing portion, the sealing portion is driven by a motion of the connecting portion to turn on or off the at least one liquid flowing passage.

5. The base for the household appliance according to claim 4, wherein:
the sealing portion is a valve ball arranged in the at least one flowing passage, the valve ball is in sealed contact with an inner wall of the at least one liquid flowing passage to turn off the at least one liquid flowing passage, and the valve ball is provided with a through valve hole;
the connecting portion is a valve rod, one end of the valve rod sticks inside the communicating piece and is connected with the valve ball, and another end of the valve rod sticks outside the communicating piece; and
the valve rod is rotatable to drive the valve ball to rotate until the through valve hole communicates with the at least one liquid flowing passage so as to turn on the at least one flowing passage.

6. The base for the household appliance according to claim 4, wherein;

the at least one liquid flowing passage includes at least two liquid flow passages provided inside the communicating piece, a number of control devices provided is set according to a number of the at least two liquid flowing passages provided, each one of the control devices controls to turn on or off one of the at least two liquid flowing passages; or one of the control devices simultaneously controls to turn on or off all the at least two liquid flowing passages.

7. The base for the household appliance according to claim 5, wherein:
the valve rod sticks out from a bottom side of the communicating piece, a mounting hole for allowing the valve rod to go through is provided on the bottom side of the communicating piece.

8. The base for the household appliance according to claim 5, wherein:
the manual control valve comprises a bearing and a knob, the bearing is provided on the communicating piece, and the valve rod is disposed though the bearing to prevent the valve rod form deflecting, the knob is mounted on one end, sticking outside the communicating piece, of the valve rod.

9. The base for the household appliance according to claim 7, wherein:
the manual control valve comprises a bearing and a knob, the bearing is provided on the communicating piece, and the valve rod is disposed though the bearing to prevent the valve rod form deflecting, the knob is mounted on one end, sticking outside the communicating piece, of the valve rod.

10. The base for the household appliance according to claim 5, wherein;
the at least one liquid flowing passage includes at least two liquid flow passages provided inside the communicating piece, a number of control devices provided is set according to a number of the at least two liquid flowing passages provided, each one of the control devices controls to turn on or off one of the at least two liquid flowing passages; or one of the control devices simultaneously controls to turn on or off all the at least two liquid flowing passages.

11. A household appliance having comprising:
the base for the household appliance according to claim 1; and
a housing, wherein:
a bottom of the housing is provided with the at least two supports for the household appliance communicated with each other.

12. The household appliance according to claim 11, comprising:
a door arranged on the housing, the door configured to be opened by a user to operate the control device to control the hydraulic medium to flow or be cut off between the at least two supports for the household appliance.

* * * * *